(12) United States Patent
Laval (10) Patent No.: US 11,392,813 B2
(45) Date of Patent: Jul. 19, 2022

(54) ELECTRONIC TAG (71) Applicant: Sean Emile Laval, Johannesburg (ZA)

(72) Inventor: Sean Emile Laval, Johannesburg (ZA)

( * ) Notice: Subject to any disclaimer, the term of this patent is extended or adjusted under 35 U.S.C. 154(b) by 0 days.

(21) Appl. No.: 16/754,082

(22) PCT Filed: Oct. 26, 2018

(86) PCT No.: PCT/IB2018/058379
§ 371 (c)(1),
(2) Date: Apr. 6, 2020

(87) PCT Pub. No.: WO2019/082144
PCT Pub. Date: May 2, 2019

(65) Prior Publication Data
US 2020/0334508 A1 Oct. 22, 2020

(30) Foreign Application Priority Data

Oct. 26, 2017 (ZA) .................................. 2017/07297

(51) Int. Cl.
*G06K 19/07* (2006.01)
(52) U.S. Cl.
CPC ..... *G06K 19/0717* (2013.01); *G06K 19/0725* (2013.01)
(58) Field of Classification Search
None
See application file for complete search history.

(56) References Cited

U.S. PATENT DOCUMENTS

| 5,442,334 A * | 8/1995 | Gallo | G08B 13/242 340/572.3 |
| 5,508,684 A * | 4/1996 | Becker | G08B 13/242 29/592.1 |
| 6,411,567 B1 * | 6/2002 | Niemiec | A61J 7/0481 368/10 |

(Continued)

FOREIGN PATENT DOCUMENTS

| EP | 0512543 A2 | 11/1992 |
| GB | 2308947 A | 7/1997 |

OTHER PUBLICATIONS

International Searching Authority, International Search Report and Written Opinion for International Application No. PCT/IB2018/058379, dated Mar. 4, 2019, (10 pages), Austrian Patent Office, Vienna, Austria.

*Primary Examiner* — Muhammad Adnan
(74) *Attorney, Agent, or Firm* — Alston & Bird LLP (57) ABSTRACT

This invention relates to an electronic tag (10) comprising sensing means (12) for sensing at least one condition, a control module (14), electrically connected to and in data communication with the sensing means (12), for receiving data relating to the at least one sensed condition, a transmitter module (16), electrically connected to and in data communication with the control module (14), for transmitting, for reception by a remote monitoring station (18), a notification signal including the data relating to the at least one sensed condition, and input circuitry (20), electrically connected to and in data communication with the control module (14), for regulating the operation of the control module (14), by providing a limit for the at least one sensed condition depending on the physical configuration thereof.

19 Claims, 3 Drawing Sheets

(56) References Cited

U.S. PATENT DOCUMENTS

| | | | | |
|---|---|---|---|---|
| 7,460,015 B2* | 12/2008 | Forster | ............... | G06K 19/0717 340/10.5 |
| 7,649,460 B2* | 1/2010 | Rodgers | ............ | G08B 13/2434 340/572.1 |
| 8,356,758 B1* | 1/2013 | Cok | ................... | G06K 19/0717 235/492 |
| 8,448,871 B2* | 5/2013 | Hioki | ............... | G06K 19/07749 235/487 |
| 8,465,425 B2* | 6/2013 | Heller | .................. | A61B 5/7445 600/365 |
| 8,717,164 B2* | 5/2014 | Williams | ............... | G06Q 50/06 73/170.01 |
| 8,866,613 B2* | 10/2014 | Luciano, Jr. | ........... | G06K 19/04 340/572.1 |
| 9,000,924 B2* | 4/2015 | Forster | ............... | G06K 19/0717 340/572.3 |
| 9,078,416 B2* | 7/2015 | Folkers | ................ | A61B 17/425 |
| 9,129,203 B2* | 9/2015 | Ishida | ............... | G06K 19/07724 |
| 10,074,048 B2* | 9/2018 | Selgrath | ........... | G06K 19/07758 |
| 10,618,714 B2* | 4/2020 | McNannay | .......... | B65D 75/367 |
| 11,229,553 B2* | 1/2022 | Chen | ................. | A61F 13/00987 |
| 2005/0223826 A1* | 10/2005 | Petersen | ............... | A61J 7/0481 73/865.9 |
| 2006/0145863 A1* | 7/2006 | Martin | .................... | G01K 3/04 340/572.8 |
| 2006/0202042 A1 | 9/2006 | Chu | | |
| 2007/0258048 A1* | 11/2007 | Pitchers | ............. | G06K 19/0717 353/26 R |
| 2009/0194452 A1* | 8/2009 | Hession | .................. | A61J 1/035 206/531 |
| 2009/0302120 A1* | 12/2009 | Omura | ................ | G03H 1/0256 235/492 |
| 2010/0000899 A1* | 1/2010 | Burg | .................... | A61J 7/0436 206/459.1 |
| 2010/0090809 A1* | 4/2010 | Yeo | .......................... | H04Q 9/00 340/10.41 |
| 2013/0284812 A1* | 10/2013 | Cok | .................... | G06K 19/07749 235/492 |
| 2013/0285681 A1* | 10/2013 | Wilson | .................... | A61J 1/035 324/693 |
| 2015/0294209 A1* | 10/2015 | Mehring | ............ | G06K 19/0702 29/593 |
| 2016/0300285 A1* | 10/2016 | Gandhi | ............ | G06K 19/0723 |
| 2017/0229000 A1* | 8/2017 | Law | ........................ | G01K 3/04 |
| 2019/0220632 A1* | 7/2019 | Sengstaken, Jr. | .. | G06K 19/0716 |

* cited by examiner

ELECTRONIC TAG

CROSS REFERENCE TO RELATED APPLICATIONS

This application is a National Stage Application, filed under 35 U.S.C. § 371, of International Application No. PCT/IB2018/058379, filed Oct. 26, 2018, which international application claims priority to South African Application No. 2017/07297, filed Oct. 26, 2017; the contents of both of which as are hereby incorporated by reference in their entirety.

BACKGROUND

Related Field

This invention relates to electronic tags. More specifically, but not exclusively, this invention relates to an electronic tag that can be selectively configured by a user to determine its operational parameters. The invention also relates to a method of selectively configuring an electronic tag.

Description of Related Art

Electronic tags are well known and widely used whereby they are attached to articles in order to monitor various characteristics of such articles such as, for example, their geographical location, temperature, and the like. The use of electronic tags has provided, and continues to provide, enormous tracking and control benefits to, amongst others, logistics organisations, inventory control and the retail industry.

In some instances, generally depending on the type of article, it is desirable for a user to be notified if the article has been subjected to conditions falling outside preferred operating conditions. In this regard, it is known for articles to be fitted with tags that have been pre-configured to sense one or more conditions and to react when one or more conditions are sensed that fall outside pre-configured operational parameters. In For example, it is known for a temperature sensitive product, such as ice cream, being transported from one location to another to be fitted with a tag that that has been pre-configured to send an alarm signal to a monitoring station when the product is exposed to excessive temperatures, as it would compromise the quality of the product.

Electronic tags of the aforementioned kind are pre-configured according to a particular operational parameter by electronic means which require specialist software programming knowledge and know-how, and are therefore generally pre-configured as part of their manufacturing process. It is furthermore either not possible or very difficult for users to adjust the operational parameter of such pre-configured devices, which often necessitate users having to purchase a number of tags having been pre-set to operate at different operational parameters, and from which a user then has to select a specific tag depending on the requirements. This, obviously, has unnecessary cost implications to the user. Also, tags which can be configured by electronic means, require suitable hardware components to facilitate such configuration, such as near field communication, for example, which adds to the cost of the product.

Available single-use (i.e. disposable) tags provide only historical data which does not empower a supplier to intervene and protect its assets, for example, whilst being transported.

Also, tags that are configured to operate on a low-power wide-area network (LPWAN) are generally too expensive to be considered for disposal purposes, do not generally monitor the physical packagers throughout the entire logistics chain, and are cumbersome to attached to the outside of pre-sealed packages.

There is a need for especially single-use tags that are able to provide real-time alerts to be produced at a low price in order for them to be used on a wider range of products, including low-cost products.

OBJECT OF THE INVENTION

It is accordingly an object of the present invention to provide an electronic tag and a method of selectively configuring an electronic tag with which the above disadvantages could be overcome, or at least reduced, and/or that would be a useful alternative to known electronic tags and methods of configuring electronic tags.

BRIEF SUMMARY

According to a first aspect of the invention, there is provided an electronic tag comprising:
  sensing means for sensing at least one condition;
  a control module, electrically connected to the sensing means, for receiving data relating to the at least one sensed condition;
  a transmitter module, electrically connected to the control module, for transmitting, for reception by a remote monitoring station, a notification signal including the data relating to the at least one sensed condition; and
  input circuitry, electrically connected to the control module, for regulating the operation of the control module, by providing a limit for the at least one sensed condition depending on the physical configuration thereof,
  the control module being configured to detect the physical configuration of the input circuitry, and to cause the notification signal to be transmitted, via the transmitter module, when the at least one sensed condition corresponds to the limit.

There is provided for the detection of the physical configuration of the input circuitry to include determining the continuity thereof.

There is also provided for the physical configuration of the input circuitry to be modifiable whereby the limit is selectively selectable, thereby selectively configuring the operational parameters of the electronic tag. Preferably, the physical configuration of the input circuitry may be modifiable whereby a plurality of limits is selectively selectable.

The physical configuration of the input circuitry may be modifiable by separating a portion of the input circuitry from a remainder thereof, to thereby affect the continuity, and accordingly the digital state, of the input circuitry.

According to an example embodiment of the invention, the electronic tag may include indication means that indicates optically the limit, or, preferably, a plurality of limits.

According to a further example embodiment of the invention, the electronic tag may include a memory module, electrically connected to the control module, for storing, at least temporarily, the data relating to the at least one sensed condition.

There is provided for the input circuitry to include a group of conductive elements which are arranged in a plurality of loops which are connected, in parallel, to one another.

According to an example embodiment of the invention, the control module may be configured to detect the physical configuration of the input circuitry by causing an electric current to pass through each of the loops and measuring the voltage over terminals of the respective loops.

According to a further example embodiment of the invention, the control module may be configured to detect the physical configuration of the input circuitry by measuring the digital state of each of the loops.

A feature of the invention provides for the plurality of loops to include an activation loop which is automatically separated from a remainder of the input circuitry when any one of the other loops are separated, which separation of the activation loop causing the control module to be activated.

The condition may be selected from the group comprising temperature, moisture, geographical location, impact, inclination, tamper, light, sound, and pressure.

The sensing means may include a suitable device that is adapted for measuring the at least one condition, including, but not limited to, a thermometer, accelerometer, inclinometer, hygrometer, barometer, receiver of a wireless network infrastructure, and a receiver of a satellite-based navigation system.

The transmitter module may transmit the notification signal via a wireless communications network utilising a suitable communication protocol or standard, for reception by the remote monitoring station. Preferably, the wireless communications network may comprise a low-power wide-area network.

According to a further example embodiment of the invention:
- the sensing means may sense a plurality of conditions;
- the control module may receive data relating to the plurality of sensed conditions;
- the transmitter module may transmit the notification signal that includes the data relating to any one or more of the plurality of sensed conditions; and
- the input circuitry may regulate the operation of the control module by providing limits for each of the plurality of sensed conditions depending on the physical configuration of the input circuitry, the control module being configured to detect the physical configuration of the input circuitry, and to cause the notification signal to be transmitted, via the transmitter module, when any one or more of the plurality of sensed conditions correspond to their respective limits.

There is provided for the input circuitry to include a number of groups of conductive elements, with each group arranged in a plurality of loops which are connected, in parallel, to one another. Preferably, the plurality of loops of each group may be arranged, preferably concentrically, as a cascaded array of loops, whereby a succeeding loop is of a larger size than the preceding loop.

The physical appearance of each of the groups of conductive elements may regulate the operation of the control module, by separately providing a limit for a particular sensed condition.

According to a second aspect of the invention, there is provided a method of selectively configuring an electronic tag, including the step of modifying the physical configuration of input circuitry forming part of the electronic tag to set the operational parameter of the electronic tag.

There is provided for the operational parameter to include, the electronic tag being configured to transmit a notification signal, for reception by a remote monitoring station, when at least one condition, sensed by the electronic tag, corresponds to a limit that is determined by the physical configuration of the input circuitry.

The electronic tag may be operable according to a number of operational parameters, depending on the physical configuration of the input circuitry. A specific operational parameter may correspond to a particular physical configuration of the input circuitry.

The physical configuration of the input circuitry may be modifiable by separating a portion of the input circuitry from a remainder thereof, to thereby affect the continuity, and accordingly the digital state, of the input circuitry.

These and other features of the invention are described in more detail below.

BRIEF DESCRIPTION OF THE FIGURES

Embodiments of the invention are described below, by way of non-limiting examples only and with reference to the accompanying diagrams in which.

DETAILED DESCRIPTION OF VARIOUS EMBODIMENTS

Figure 1:
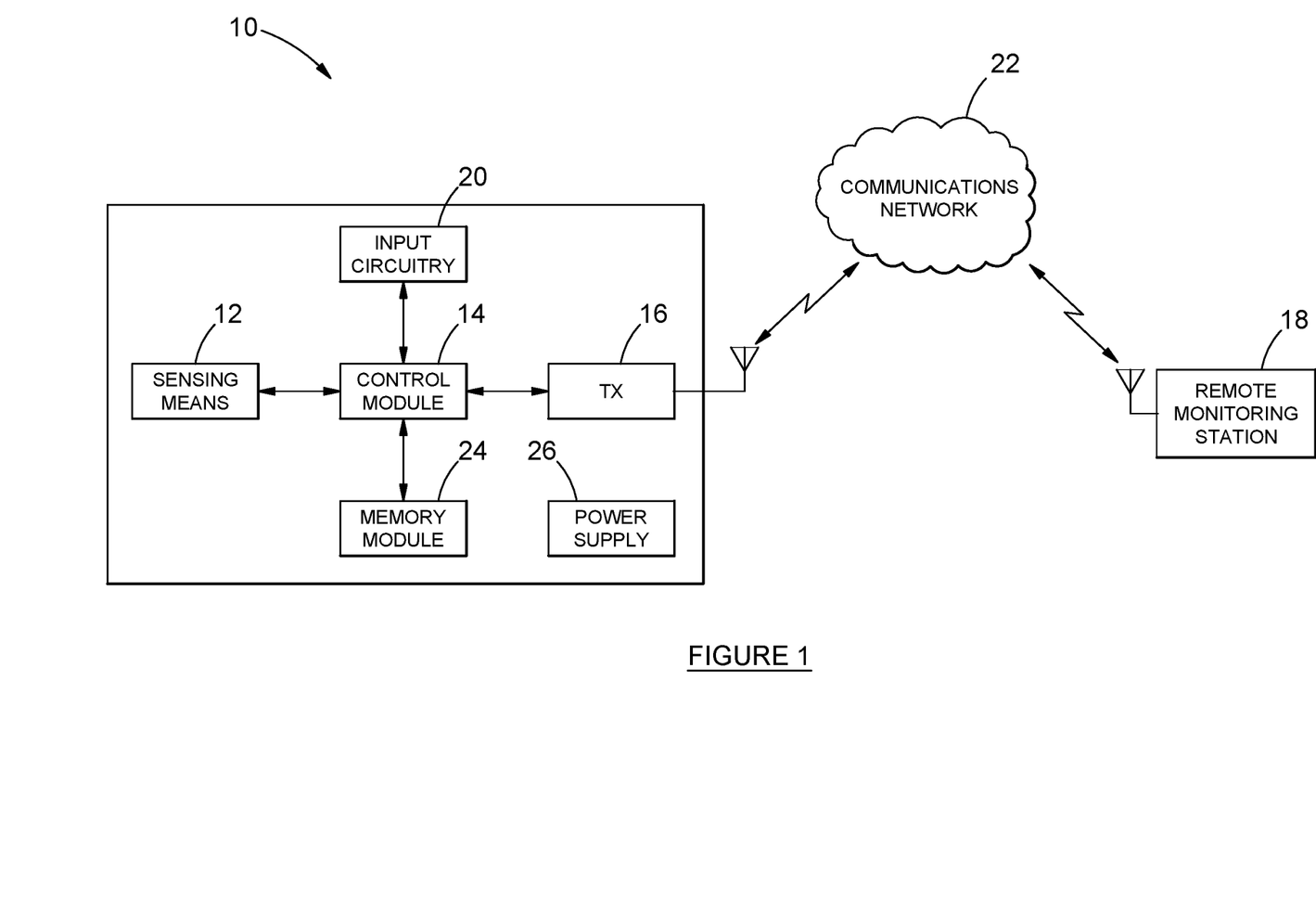
FIG. 1 is schematic block and line diagram of an electronic tag, according to the invention.
Figure 2:
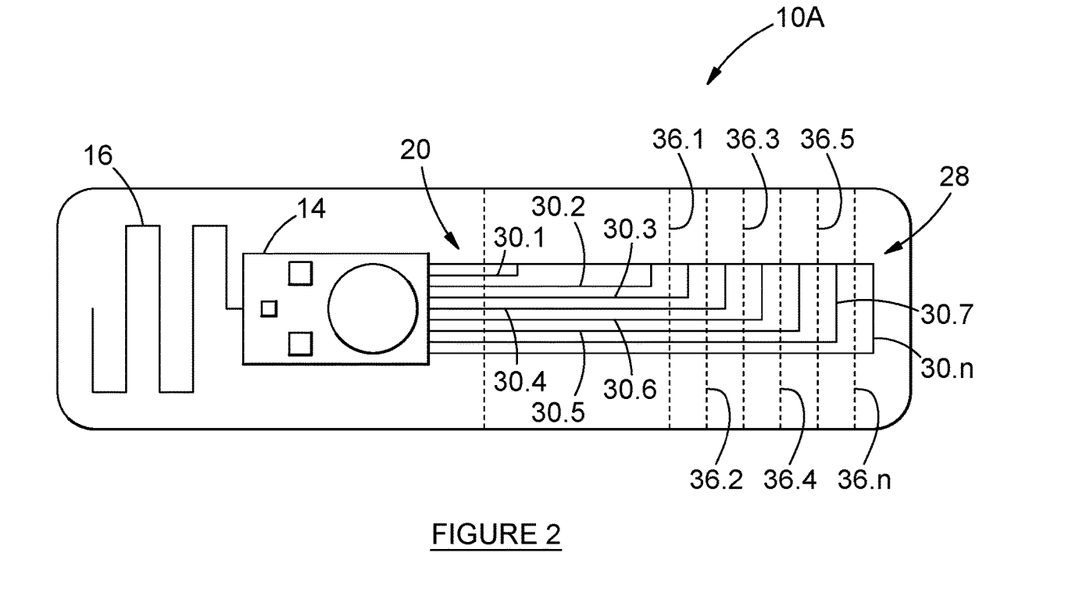
FIG. 2 is a schematic diagram of a first example configuration of the electronic tag of FIG. 1, without a cover.
Figure 3:
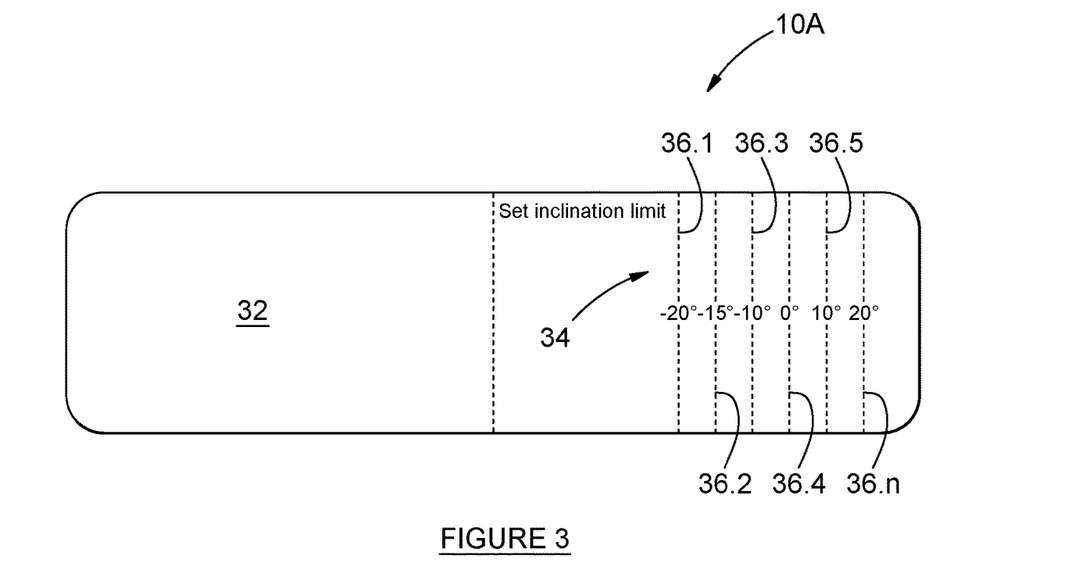
FIG. 3 is a schematic diagram of the electronic tag of FIG. 2, with a cover.
Figure 4:
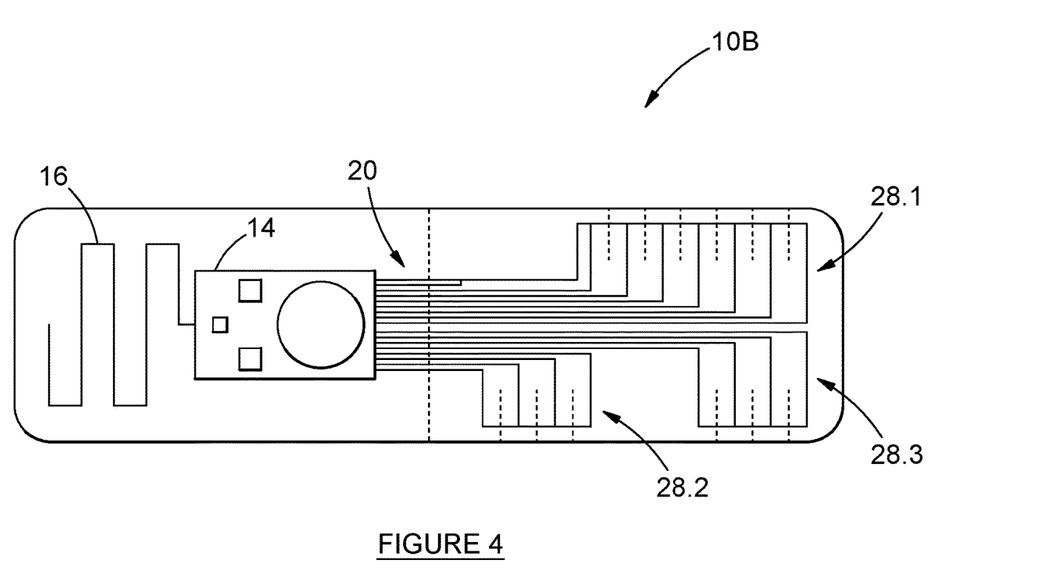
FIG. 4 is a schematic diagram of a second example configuration of the electronic tag of FIG. 1, without a cover.
Figure 5:
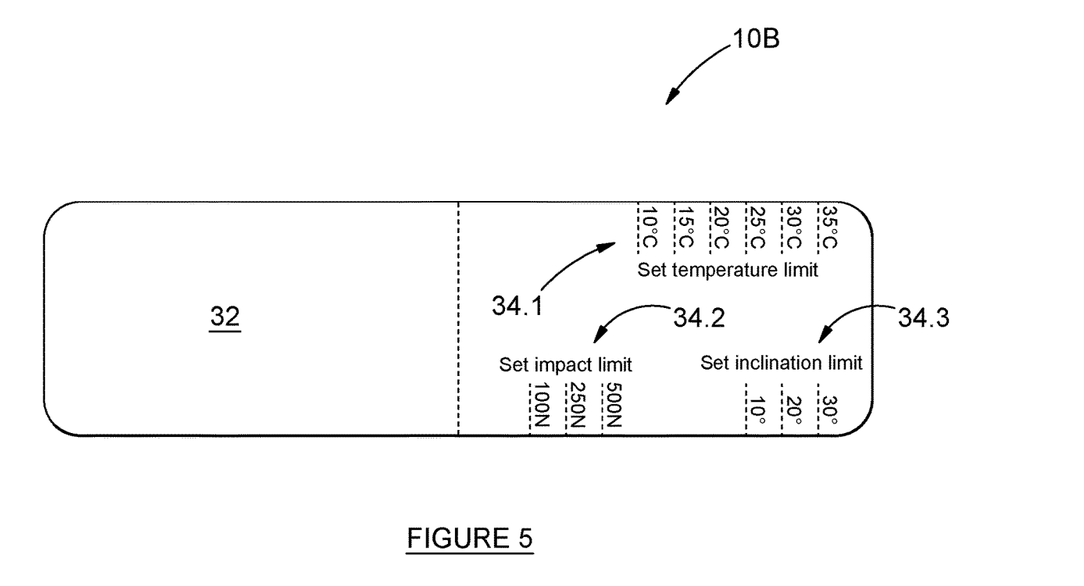
FIG. 5 is a schematic diagram of the electronic tag of FIG. 4, with a cover.

With reference to the Figures, in which like numerals refer to like features, an electronic tag, in accordance with the invention, is indicated generally by reference numeral 10 in FIG. 1, an electronic tag having a first example configuration, in accordance with the invention, is indicated generally by reference numeral 10A in FIGS. 2 and 3, and an electronic tag having a second example configuration, in accordance with the invention, is indicated generally by reference numeral 10B in FIGS. 4 and 5.

Referring to FIG. 1, the electronic tag 10 comprises sensing means 12 for sensing at least one condition, a control module 14, electrically connected to and in data communication with the sensing means 12, for receiving data relating to the at least one sensed condition, a transmitter module 16, electrically connected to and in data communication with the control module 14, for transmitting, for reception by a remote monitoring station 18, a notification signal including the data relating to the at least one sensed condition, and input circuitry 20, electrically connected to and in data communication with the control module 14, for regulating the operation of the control module 14, by providing a limit for the at least one sensed condition depending on the physical configuration thereof.

The control module 14 is configured to detect the physical configuration of the input circuitry 20, and to cause the notification signal to be transmitted, via the transmitter module 16, when the at least one sensed condition corresponds to the limit.

The notification signal is transmitted via a wireless communications network 22 utilising a suitable communication protocol or standard. According to an example embodiment of the invention, the network 22 comprises a low-power wide-area network (LPWAN). However, it should be appreciated that in other embodiments of the invention the network 22 could any other or any combination of known telecommunication networks.

The tag 10 also includes a memory module 24, being electrically connected to and in data communication with the control module 14, for storing, at least temporarily, the data relating to the at least one sensed condition.

A power supply 26, in the form of an on-board battery, is also provided for powering the tag 10, when required.

It should be appreciated that even though the aforementioned tag components are illustrated separately in FIG. 1, some of them could be produced and installed as a single component having an array of functionalities as discussed above with reference to the individual components.

In an example embodiment of the invention, the tag 10 includes attachment means (not shown) for attaching it to an article to be monitored by the tag 10. The attachment means could, for example, comprise an adhesive element, clip, or the like disposed on one side of the tag 10.

In FIG. 2, which shows a first example configuration of the electronic tag 10A, it is shown that the input circuitry 20 comprises a group of conductive elements 28 which are arranged in the form of a plurality of loops 30.1 to 30.n being electrically connected, in parallel, to one another. The loops 30.1 to 30.n are arranged, substantially concentrically, as a cascaded array of loops, whereby a succeeding loop, for example loop 30.3, is of a larger size and longer in length than the preceding loop 30.2.

The tag 10A is selectively configurable, to set its operational parameters, by modifying the physical configuration of the input circuitry 20. This involves separating a portion of the circuitry 20 from a remainder thereof which affects the continuity, and accordingly digital state, of at least one of the loops 30.1 to 30.n, and thus of the input circuitry 20.

Referring not also to FIG. 3, which shows the tag 10A with a cover 32, it is shown that that the tag 10A includes indication means 34 that indicates the condition that is measurable by the tag 10A and a range of limits that can be selected whereby the tag 10A would be configured to operate in accordance with for the particular condition. In this example embodiment of the invention, the condition is in the form of inclination, and the respective limits that the tag 10A can be configured to operate according to, and which are selectable by a user, are indicated by broken lines 36.1 to 36.n. As shown, each of the lines 36.1 to 36.n corresponds to a particular limit.

It will be appreciated that the condition to be sensed by the tag 10A is a variable that could comprise any one selected from the group comprising temperature, moisture, geographical location, impact, tamper, light, sound, and pressure. In order for the tag 10A to measure any one of these conditions, the sensing means 12 would comprise a suitable device that is adapted for measuring the condition, including, but not limited to, a thermometer, accelerometer, inclinometer, hygrometer, barometer, receiver of a wireless network infrastructure, and a receiver of a satellite-based navigation system.

The limit could be any one or more selected from the group comprising:
 a maximum threshold;
 a minimum threshold; and
 a geographical area.

In the example embodiment shown in FIGS. 2 and 3, a user is able to selectively configure the tag 10A wherein it operates accordingly to any one of the parameters denoted by 34 and lines 36.1 to 36.n. The tag 10A would be in an inactive state so to conserve its power supply 26 for when it is required.

In use, before the tag 10A is attached to a tilt sensitive article whose movement is to be tracked, its operational parameters need to be configured which involves the step of a user cutting along any one of the lines 36.1 to 36.n. This causes the physical configuration of the input circuitry 20 to be modified whereby a portion of the input circuitry 20 is separated from a remainder thereof, to thereby affect the continuity, and accordingly the digital state, of the input circuitry 20.

If it is desired for the article to, for example, not be tilted (i.e. the condition) by more than 10° (i.e. the limit), the user would cut along a line corresponding to that limit, being line 36.5 in this example embodiment. By cutting any one of the lines 36.1 to 36.n, tag 10A is selectively configured to operate in accordance with a parameter (i.e. a selected condition and limit) corresponding to the line that has been cut. In selecting a limit of 10°, the physical configuration of the input circuitry 20 has been modified by separating a portion to the right-hand side of line 36.5 (including loops 30.7 and 30.n) from the remainder of the circuitry 20 on the left-hand side of line 36.5 (including loops 30.1 to 30.6).

The cutting of line 36.5 causes the tag 10A to be activated. The outer-most loop 30.n is an activation loop and is automatically separated from a remainder of the input circuitry 20 when any one of the loops are separated, which separation of the activation loop 30.n causing the control module 14 to be activated. Activation of the tag 10A is controlled by the outer-most loop 30.n in the cascaded loop array 28, the result of which is that separation of any of the inner loops 36.1 to 36.6 within the cascade 28 automatically separates the outer-most loop 36.n and activates the control module 14, which then measures the overall state of the cascaded loop array 28. The activation loop 36.n may be connected either directly to the power supply 26, or to the control module 14. In the latter case the control module 14 is awakened by a change of logical state in the loop 30.n.

The control module 14 is configured to detect the physical configuration of the input circuitry 20 by determining continuity and digital state thereof. The control module 14 could be configured to detect the physical configuration of the input circuitry 20 by causing an electric current to pass through each of the loops 30.1 to 30.n and measuring the voltage over terminals of the respective loops 30.1 to 30.n. The terminals are located at the interface of the loops 30.1 to 30.n and the control module 14. Alternatively, or in addition, the control module 14 could be configured to detect the physical configuration of the input circuitry 20 by measuring the digital state (high/low voltage) of each of the loops 30.1 to 30.n. Each of the cascaded loops 30.1 to 30.n, the state of which is altered by separating parts of the input circuitry 20 from the remainder thereof.

The tag 10A is thus configured to, once an inclination (i.e. the condition) is detected in the order of 10° (i.e. the selected limit), a notification signal is caused to be transmitted, for reception by the remote monitoring station 18, via the transmitter module 16 and communications network 22, thereby notifying the monitoring station 18 that the condition's elected limit has been reached and/or breached. As shown, the transmitter module 16 include a suitable wireless transmitter element in the form of an antenna 16.

It should be appreciated that aforementioned methodology is equally applicable to any other condition and limit that is selectable disclosed herein.

FIGS. 4 and 5 show a second example configuration of the electronic tag 10B that is selectively configurable whereby the operating parameters of the tag 10B could be set for a plurality of conditions, including the setting of a limit for each of them.

The tag 10B includes a number of grouped conductive elements 28.1 to 28.3, each of which being provided for setting a limit for a different condition to be sensed. In the example shown, group 28.1 is provided to activate the tag 10B and set a temperature limit, group 28.2 is provided to activate the tag 10B and set an impact limit, and group 28.3 is provided to activate the tag 10B and set an inclination limit.

Similar to as is described above in relation to group 28 of tag 10A, each group 28.1 to 28.3 is arranged in a plurality of loops which are connected, in parallel, to one another. Preferably, the plurality of loops of each group may be arranged, preferably concentrically, as a cascaded array of loops, whereby a succeeding loop is of a larger size than the preceding loop.

The physical appearance of each of the groups of conductive elements 28.1 to 28.3 regulates the operation of the control module 14, by separately providing a limit for a particular sensed condition.

It should be appreciated that the functionality and configuration of the tag 10B in relating to each of the groups 28.1 to 28.3, is the same as described above at the hand of tag 10A with its group of conductive elements 28.

Sensing means of the tag 10B is thus able to sense, through a plurality of suitable sensing devices, a plurality of conditions. The control module 14 is connected to the grouped conductive elements 28.1 to 28.3 to receive data relating to the plurality of sensed conditions. The transmitter module 14 is configured to transmit the notification signal that includes the data relating to any one or more of the plurality of sensed conditions, and the grouped conductive elements 28.1 to 28.3 regulate the operation of the control module 14 by each of them providing, to the control module 14, a limit for one of the plurality of sensed conditions depending on its physical configuration. The control module 14 is configured to detect the physical configuration of each of the grouped conductive elements 28.1 to 28.3, and to cause the notification signal to be transmitted, via the transmitter module 16, when any one or more of the plurality of sensed conditions correspond to their respective limits.

Indication means 34.1 to 34.3 indicates optically the conditions that are measurable by the tag 10B and ranges of limits that can be selected for each of them whereby the tag 10B would be configured to operate in accordance with for those particular conditions.

From the aforegoing description, it follows that the invention provides an electronic tag 10 that provides a range of options according to which the tag could be easily configured to operate, and that does not require specialised equipment and knowledge to operate and configure. Also, the tag 10 is capable of providing real-time feedback to a user so that swift action can be taken. Furthermore, the tag 10 is manufactured from a resiliently deformable material.

Further advantages that flow from the invention:
The tag 10 being inexpensive which means it could be considered for disposable applications;
Due to the configuration of the tag, it has a low profile and is unobstructive;
The tag 10 can be naturally incorporated into current supply chain processes;
A supplier could be alerted if the package is tampered with, or if environmental conditions are exceeded;

The tag 10 is capable of providing retrospective package handling and environmental data;
The tag 10 can be easily configured on-site to suit variable monitoring requirements; and
The tag 10 has sufficient battery capacity for several months of operation and supports limited transmissions.

Smart Flexible Label Seal

1. An electronic circuit whereby the digital configuration and subsequent operation of such circuit can be altered, by the user, through the intentional physical severing or removal of defined segments of the circuit.
2. A flexible label with or without adhesive backing (herewith referred to as the "device"), incorporating a radio transmitter, microcontroller, sensors and power supply. The operational parameters of the device are set by the end user through physical severing or removal of labelled sections of the device.
3. A device as defined that sends an alert, in the form of radio communication inclusive of wide area radio network capability, If environmental thresholds are exceeded, or tampering of the device is detected, within or outside the intended usage constraints of the device.
4. The device when attached to items or merchandise will monitor a range of environmental scenarios such as location, temperature, tilt, impact, security and the like.

It will be appreciated by those skilled in the art that the invention is not limited to the precise details as described herein and that many variations are possible without departing from the scope of the appended claims. As such, the present invention extends to all functionally equivalent structures, methods and uses that are within its scope. For example, the tag 10 may be of any shape, including, but not limited to, rectangular, square, circular, triangular, and the like. Also, the tag 10 could be configured to sense and react to any number of conditions.

The description is presented by way of example only in the cause of providing what is believed to be the most useful and readily understood description of the principles and conceptual aspects of the invention. In this regard, no attempt is made to show structural details of the invention in more detail than is necessary for a fundamental understanding of the invention. The words which have been used herein are words of description and illustration, rather than words of limitation.

The invention claimed is:

1. An electronic tag comprising:
sensing means configured for sensing a plurality of conditions;
a control module, electrically connected to the sensing means and configured for receiving data relating to the plurality of sensed conditions;
a transmitter module, electrically connected to the control module and configured for transmitting, for reception by a remote monitoring station, a notification signal including the data relating to any one or more of the plurality of sensed conditions; and
input circuitry, electrically connected to the control module and configured for regulating an operation of the control module, by providing respective limits for each of the plurality of sensed conditions depending on a physical configuration that is modified by separating a portion of the input circuitry from a reminder thereof, thereby affecting the continuity of of the input circuitry, wherein the control module is configured to detect the physical configuration of the input circuitry, and to cause the notification signal to be transmitted, via the transmitter module, when any one or more of the plurality of sensed conditions correspond to their respective limits.

2. The electronic tag of claim 1, wherein detecting the physical configuration of the input circuitry includes determining a continuity thereof.

3. The electronic tag of claim 1, wherein the physical configuration of the input circuitry is modifiable whereby the limit is selectively selectable, thereby selectively configuring operational parameters of the electronic tag.

4. The electronic tag of claim 1, wherein the physical configuration of the input circuitry is modifiable by separating a portion of the input circuitry from a remainder thereof, to thereby affect a continuity, and accordingly a digital state, of the input circuitry.

5. The electronic tag of claim 1, further comprising indication means for indicating optically the respective limits.

6. The electronic tag of claim 1, wherein the input circuitry includes a group of conductive elements which are arranged in a plurality of loops which are connected, in parallel, to one another.

7. The electronic tag of claim 6, wherein the control module is configured to detect the physical configuration of the input circuitry by causing an electric current to pass through each of the plurality of loops and measuring a voltage over terminals of respective ones of the plurality of loops.

8. The electronic tag of claim 6, wherein the control module is configured to detect the physical configuration of the input circuitry by measuring a digital state of each of the plurality of loops.

9. The electronic tag of claim 1, wherein the plurality of sensed conditions are selected from the group comprising temperature, moisture, geographical location, impact, inclination, tamper, light, sound, and pressure.

10. The electronic tag of claim 1, wherein the transmitter module transmits the notification signal via a wireless communications network utilizing a suitable communication protocol or standard, for reception by the remote monitoring station.

11. The electronic tag of claim 10, wherein the wireless communications network comprises a low-power wide-area network.

12. The electronic tag of claim 1, wherein the input circuitry includes a number of groups of conductive elements, with each group arranged in a plurality of loops which are connected, in parallel, to one another.

13. The electronic tag of claim 12, wherein a physical appearance of each of the groups of conductive elements regulates the operation of the control module, by separately providing a limit for a particular sensed condition.

14. An electronic tag comprising:
sensing means configured for sensing at least one condition;
a control module, electrically connected to the sensing means, configured for receiving data relating to the at least one sensed condition;
a transmitter module, electrically connected to the control module, configured for transmitting, for reception by a remote monitoring station, a notification signal including the data relating to the at least one sensed condition; and
input circuitry, electrically connected to the control module, configured for regulating an operation of the control module, by providing a limit for the at least one sensed condition depending on a physical configuration of the input circuitry,
wherein:
the control module is configured to detect the physical configuration of the input circuitry, and to cause the notification signal to be transmitted, via the transmitter module, when the at least one sensed condition corresponds to the limit;
the input circuitry includes a group of conductive elements which are arranged in a plurality of loops which are connected, in parallel, to one another; and
the plurality of loops includes an activation loop which is automatically separated from a remainder of the input circuitry when any one of other loops are separated relative to the activation loop so as to cause the control module to be activated.

15. The electronic tag of claim 14, wherein detecting the physical configuration of the input circuitry includes determining a continuity thereof.

16. The electronic tag of claim 14, wherein either:
the physical configuration of the input circuitry is modifiable whereby the limit is selectively selectable, thereby selectively configuring operational parameters of the electronic tag; or
the physical configuration of the input circuitry is modifiable by separating a portion of the input circuitry from a remainder thereof, to thereby affect a continuity, and accordingly the digital state, of the input circuitry.

17. The electronic tag of claim 14, wherein the control module is configured to detect the physical configuration of the input circuitry by causing an electric current to pass through each of the plurality of loops and measuring a voltage over terminals of respective ones of the plurality of loops.

18. The electronic tag of claim 14, wherein the control module is configured to detect the physical configuration of the input circuitry by measuring a digital state of each of the plurality of loops.

19. The electronic tag of claim 14, wherein the at least one sensed condition is selected from the group comprising temperature, moisture, geographical location, impact, inclination, tamper, light, sound, and pressure.

* * * * *

UNITED STATES PATENT AND TRADEMARK OFFICE
CERTIFICATE OF CORRECTION

PATENT NO. : 11,392,813 B2
APPLICATION NO. : 16/754082
DATED : July 19, 2022
INVENTOR(S) : Laval It is certified that error appears in the above-identified patent and that said Letters Patent is hereby corrected as shown below:

In the Claims

Column 8
Line 64, "thereby affecting the continuity of of the input circuitry," should read --thereby affecting the continuity of the input circuitry,--

Signed and Sealed this
Thirtieth Day of August, 2022

Katherine Kelly Vidal
*Director of the United States Patent and Trademark Office*